United States Patent

Bansbach et al.

[11] Patent Number: 6,145,398
[45] Date of Patent: Nov. 14, 2000

[54] ELECTRONICALLY CONTROLLED SHIFT SYSTEM FOR A MANUAL TRANSMISSION

[75] Inventors: Eric A. Bansbach, Fayetteville; Randy W. Adler, Seneca Falls, both of N.Y.; Robert S. Zucker, West Bloomfield, Mich.; Sankar K. Mohan, Syracuse; Christopher W. Phelan, Chittenango, both of N.Y.

[73] Assignee: New Venture Gear, Inc., Troy, Mich.

[21] Appl. No.: 09/026,991

[22] Filed: Feb. 20, 1998

[51] Int. Cl.[7] .................................................. F16H 61/40
[52] U.S. Cl. .................................. 74/335; 477/76; 477/98
[58] Field of Search .................................. 74/335, 336 R; 477/98, 76

[56] References Cited

U.S. PATENT DOCUMENTS

| | | |
|---|---|---|
| 4,493,228 | 1/1985 | Vukovich et al. .................. 74/335 X |
| 4,506,770 | 3/1985 | Schmid . |
| 4,591,038 | 5/1986 | Asagi et al. . |
| 4,618,043 | 10/1986 | Hattori et al. . |
| 4,629,045 | 12/1986 | Kasai et al. . |
| 4,677,880 | 7/1987 | Hattori et al. . |
| 4,683,996 | 8/1987 | Hattori et al. . |
| 4,685,062 | 8/1987 | Uriuhara et al. . |
| 4,732,248 | 3/1988 | Yoshimura et al. . |
| 4,926,994 | 5/1990 | Koshizawa et al. . |
| 5,029,678 | 7/1991 | Koshizawa . |
| 5,035,113 | 7/1991 | Simonyi et al. ................... 74/335 X |
| 5,043,895 | 8/1991 | Hattori et al. . |
| 5,135,091 | 8/1992 | Albers et al. . |
| 5,172,602 | 12/1992 | Jurgens et al. . |
| 5,176,234 | 1/1993 | Reik et al. . |
| 5,181,431 | 1/1993 | Zaiser et al. . |
| 5,239,895 | 8/1993 | Kroger . |
| 5,239,897 | 8/1993 | Zaiser et al. . |
| 5,246,407 | 9/1993 | Paulsen et al. . |
| 5,249,476 | 10/1993 | Zaiser et al. . |
| 5,251,503 | 10/1993 | Morris et al. .................... 74/335 X |
| 5,523,944 | 6/1996 | Kroger . |
| 5,545,108 | 8/1996 | Wagner et al. . |
| 5,910,068 | 6/1999 | Krauss et al. .................... 74/335 X |

FOREIGN PATENT DOCUMENTS

WO 97/04254  2/1997  WIPO .

*Primary Examiner*—Khoi Q. Ta
*Attorney, Agent, or Firm*—Harness, Dickey & Pierce, P.L.C.

[57] ABSTRACT

An electronically controlled shift system is provided for a synchronized manual transmission of a motor vehicle. The shift system provides greater control of gear engagement by determining an optimum shift force at shift time, by adjusting this shift force based upon engine temperature, and by applying variable shift forces to complete a gear shift. In particular, the electronically controlled shift system comprises a manually operated shift lever for selecting a gear, a transmission control module connected to the shift lever for receiving an electrical input signal indicative of a selected gear and a dual motion actuator receiving actuation signals from the transmission control module for actuating a shift rail of the transmission to engage the selected gear. The transmission control module includes a shift-out routine for axially translating the shift rail from a current in-gear position into a neutral position, a shift-across routine for rotating the shift rail (if necessary) from a first neutral position to a second neutral position that aligns with the in-gear position for the selected gear, and a shift-in routine for actuating the shift rail into selected in-gear position. In addition, shift-in routine applies an entry force for taking up synchronizer clearance, determines and applies a synchronization force and applies a lesser end force for easing the shift rail into the in-gear position.

14 Claims, 14 Drawing Sheets

ELECTRONICALLY CONTROLLED SHIFT SYSTEM FOR A MANUAL TRANSMISSION

BACKGROUND OF THE INVENTION

The present invention relates to an electronically controlled shift system for manual transmissions of a motor vehicle. More particularly, the present invention relates to an electronically controlled shift system for determining a synchronization force and for applying variable force levels to engage a selected gear of a synchronized manual transmission.

Electronics have been integrated into many automotive systems ever since the benefits of these systems were realized. In the drive train area, electronics have greatly enhanced engine control systems, automatic transmission systems (hydraulic transmissions) and four wheel drive systems. Past history has also shown the application of electronics into clutch systems. Many of these systems initially were unsuccessful due to the lack of power in the controls area. Since the advent of the microprocessor and other advanced electronic technologies, many systems that were formerly not technologically feasible, are now realizable. Automatic clutch systems are now production items on several European small car platforms.

The manual transmission has also been the target of the electronics revolution, but only in recent times. While purely mechanical manual transmissions are still dominant, some automated manual transmissions are making appearances into the marketplace. Most of this development has centered in Europe where the driving factors, including fuel economy and emissions, are most relevant.

Accordingly, a need exists for a transmission whose shift actuation is entirely electronically controlled, such that there is no mechanical link between the driver and the gearbox (excluding the clutch). Shifting of the gearbox is to be commanded by an electronic shift lever accessible to the driver. Advantages of this electronically controlled shift system include reduced noise and vibration in the passenger compartment, increased protection from driver shifting errors, easier tailoring of shift lever feel, easier location of the shift lever and a reduction in the gearbox component count. Moreover, an electronically controlled shift system provides greater control of gear engagement, such that optimum shift force can be determined at shift time, shift efforts can compensate for engine temperature and variable shift forces can be applied to shift gears.

SUMMARY OF THE INVENTION

The present invention is an electronically controlled shift system for a synchronized manual transmission of a motor vehicle. It is desirable for the shift system to provide greater control of gear engagement by determining an optimum shift force at shift time, by adjusting this shift force based upon engine temperature, and by applying variable shift forces to complete a gear shift.

According to a preferred embodiment of the present invention, an electronically controlled shift system comprises a manually operated shift lever for selecting a gear, a transmission control module connected to the shift lever for receiving an electrical input signal indicative of a selected gear and a dual motion actuator receiving actuation signals from the transmission control module for actuating a shift rail of the transmission to engage the selected gear. The transmission control module includes a shift-out routine for axially translating the shift rail from a current in-gear position into a neutral position, a shift-across routine for rotating the shift rail (if necessary) from a first neutral position to a second neutral position that aligns with the in-gear position for the selected gear, and a shift-in routine for actuating the shift rail into selected in-gear position. More particularly, shift-in routine applies an entry force for taking up synchronizer clearance, determines and applies a synchronization force and applies a lesser end force for easing the shift rail into the in-gear position.

Transmission control module further comprises a preselect module, a protection module and a clutch interlock module. Preselect module allows the vehicle driver to select the next desired gear using the shift lever, however the system does not proceed with the shift until the clutch has been disengaged. Protection module monitors shaft speed and vehicle speed, and then determines a shift condition by comparing these values to predetermined speed values for the selected gear. During an unacceptable shift condition, the protection module prevents shifting. Lastly, a clutch interlock module monitors the shift rail and prevents clutch release before the shift rail engages the selected gear by controlling a clutch interlock device connected between the clutch pedal and the clutch.

These and other advantages and features of the present invention will become readily apparent from the following detailed description, claims and drawings.

DETAILED DESCRIPTION OF THE PREFERRED EMBODIMENTS

Figure 1:
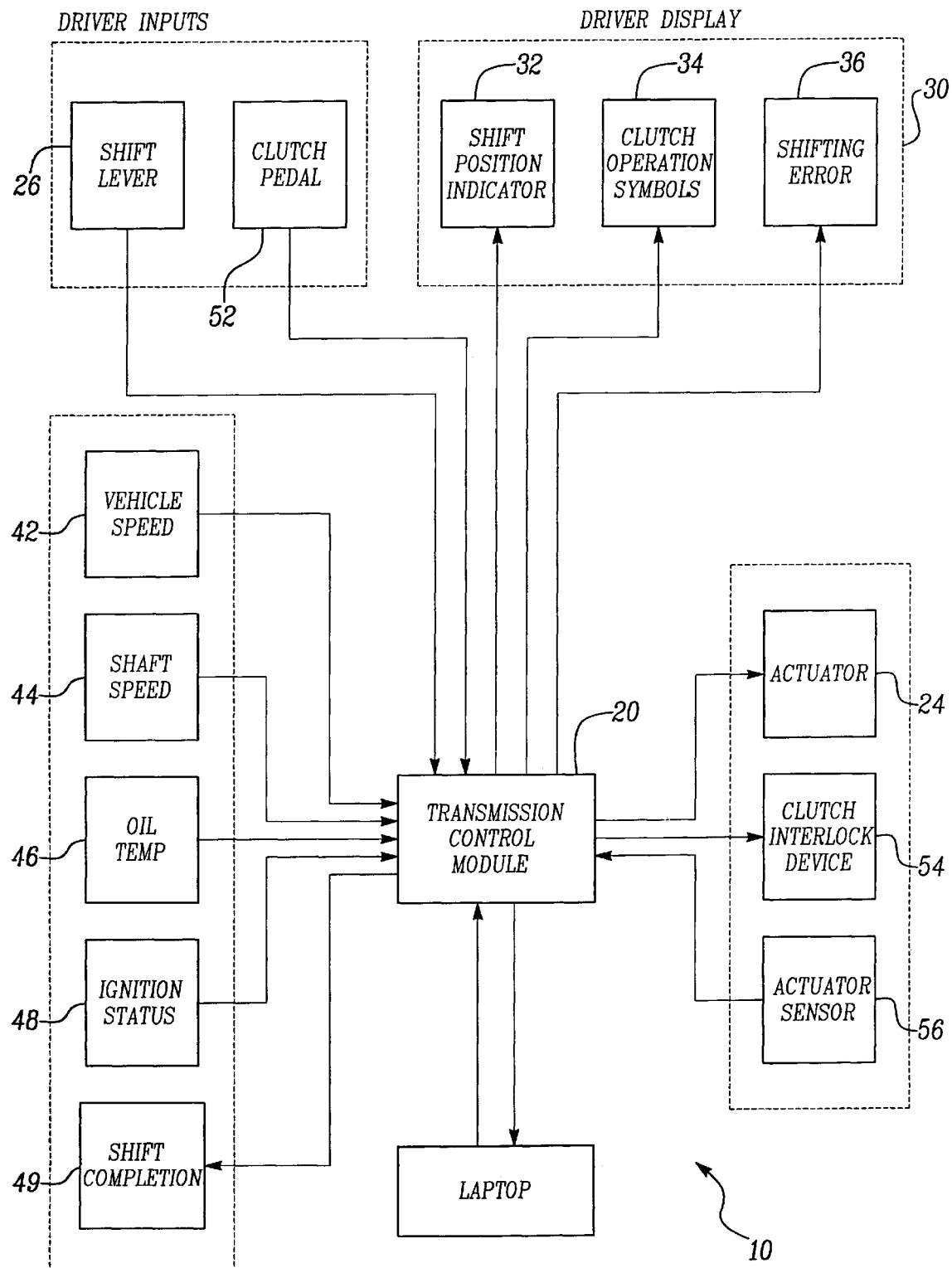
FIG. 1 is block diagram showing the basic components of an electronically controlled shift system for a manual transmission of the present invention.

An electronically controlled shift system 10 for a manual transmission in a motor vehicle is illustrated in FIG. 1. Electronically controlled shift system 10 includes a transmission control module 20, a dual-motion actuator 24, an electronic shift lever 26, a driver display 30, and a variety of sensors.

An electronically outfitted shift lever (i.e., joystick) 26 is the primary shift command mechanism, and is used by the driver to select the desired gear. Shift lever 26 is mechanically isolated from the transmission, allowing the lever to be placed anywhere within the vehicle compartment. By placing position sensors within the lever assembly, full electronic tracking of the lever position is monitored by transmission control module 20. Mechanical acting on the shift lever limits the movement to that of the double "H" patten typical on today's manual transmissions. Shift lever 26 will be free of the sometimes high shift forces and also free from miscellaneous vibrations that permeate through the shift tower into the shift lever such as nibble, double bump, clash and other general powertrain vibrations. By imitation the same type shift method as a mechanical manual transmission (double H pattern shift lever) allows the driver to maintain the same apparent control as the standard manual transmission with no driving adjustments required.

In an alternative second embodiment, pushbuttons on the steering wheel may serve as the gear selection mechanism used by the driver. Pushbuttons may replace shift lever 26 or act as a secondary gear selection option. One set of buttons initiates a shift up to the next higher gear, and a second set initiates a shift to the next lower gear. A separate Neutral/Reverse switch will engage neutral when depressed once and reverse when depressed a second time. It is also envisioned that other various (physical) configurations of an electronic gear selection mechanism may be employed in shift system 10 of the present invention.

Figure 2:
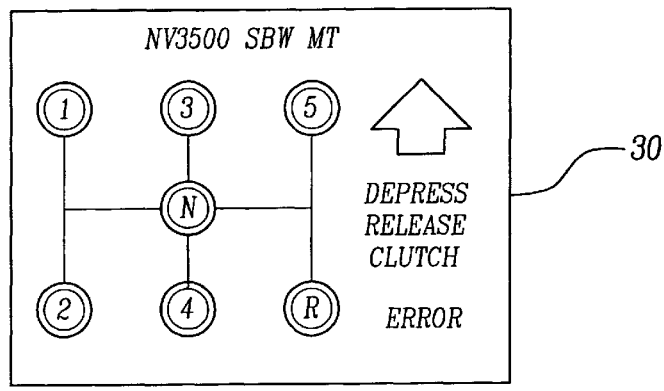
FIG. 2 is an illustration of a driver display which may be used in conjunction with the shift system of the present invention.

Driver display 30 provides a driver with visual indications of the shift lever position 32, of recommended clutch operations 34 and of an occurrence of a shifting error 36. An exemplary configuration for driver display 30 which may be located on a dashboard of any motor vehicle is shown in FIG. 2. Referring to FIG. 1, shift system 10 also incorporates additional inputs/outputs that transmit/receive electrical signals to/from transmission control module 20, including a vehicle speed sensor 42, a shaft speed sensor 44, a temperature sensor 46 for determining oil temperature, an ignition status sensor 48, a shift completion indicator 49 for providing the driver with an audible signal upon completion of a shift request and an actuator position sensor 56.

A mechanically operated clutch 50 (not shown), including a clutch pedal 52, and a clutch lever 350 operates in the same manner as with a typical mechanical manual transmission. For the driver to shift to the next desired gear however, clutch pedal 52 must be fully depressed. If shift lever 26 is moved out of gear with the clutch not disengaged, the gearbox will remain in gear with driver display 30 indicating this shifting error. Once the clutch is disengaged, the shift will continue per the command from shift lever 26. The clutch must remain disengaged until the shift is complete. Failure to do so will cause a clutch interlock device 54 to intervene (further discussed below).

Figure 3:
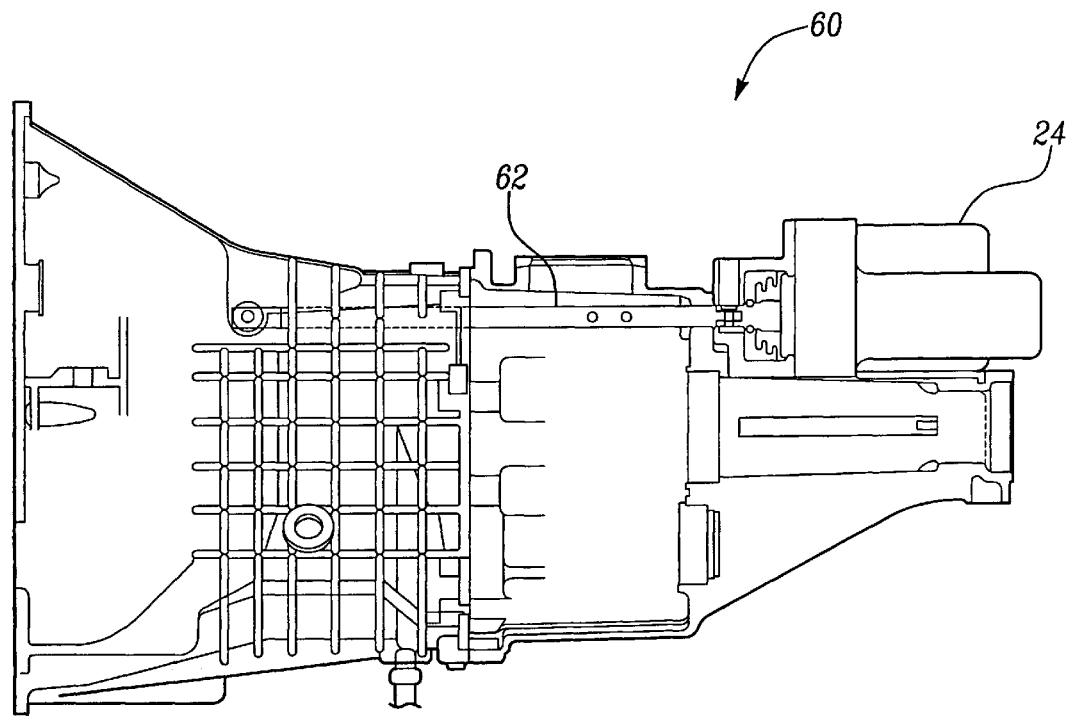
FIG. 3 is a diagram of a synchronized, single rail manual transmission used in a first preferred embodiment of the shift system of the present invention.
Figure 3A:
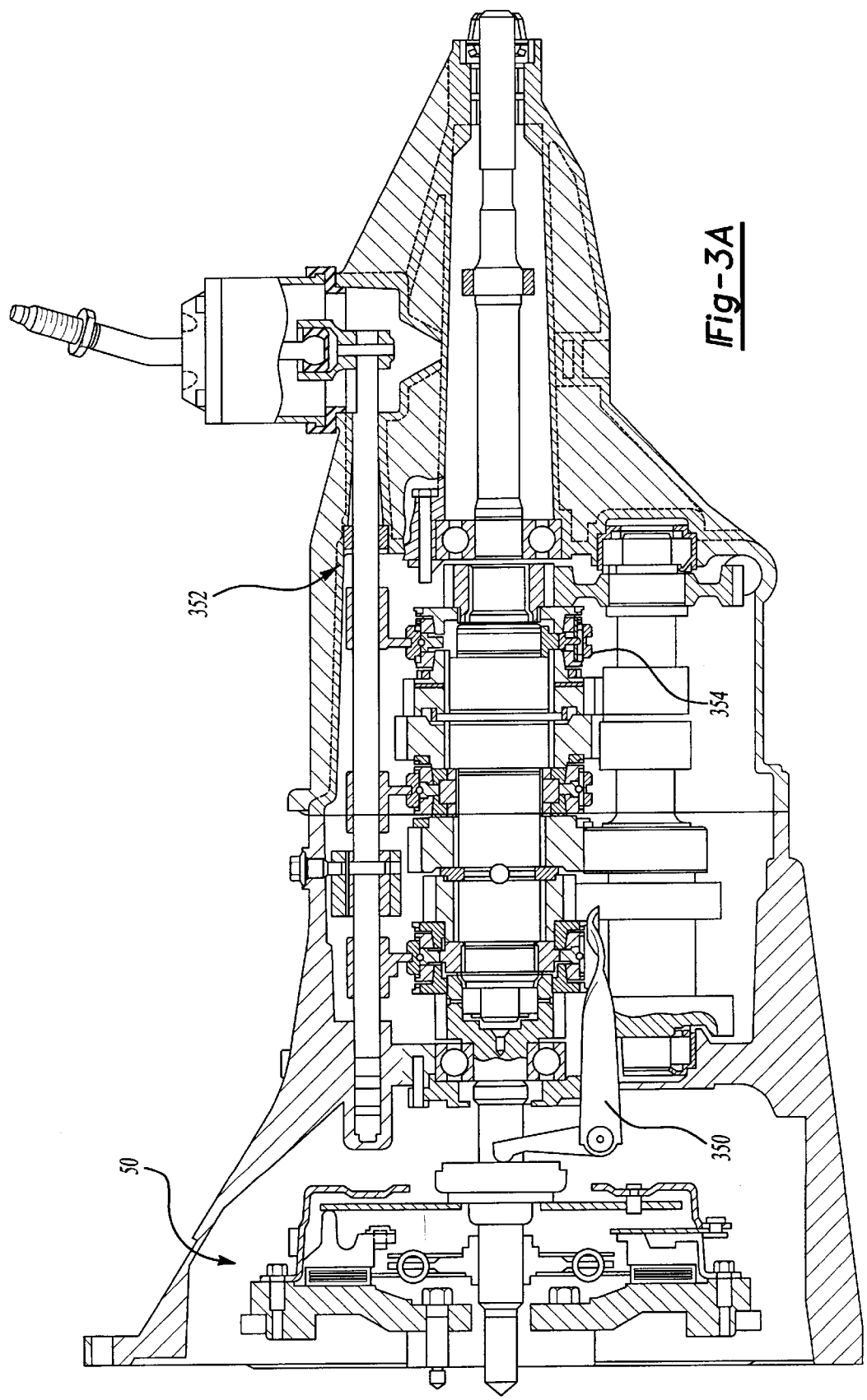
FIG. 3A is a cross sectional view of the manual transmission shown in FIG. 3

In a first preferred embodiment, as shown in FIG. 3, shift system 10 was incorporated into New Venture Gear model NV3500 manual transmission 60 which is a single rail gearbox including a plurality of synchronized gears 352, with all forward speeds synchronized. The single rail design of this transmission facilitates the mounting of actuator 24. By mounting single, dual motion (linear/rotary) actuator 24 directly to shift rail 62, the shift tower components could be eliminated, and thus resulting in a parts count reduction (and cost reduction). The target production vehicles for this gearbox include rear wheel drive cars, light trucks and utility vehicles. This first preferred embodiment was realized in a Chevrolet 6 cylinder, 2WD C pickup truck.

In this first embodiment, actuator 24 is a dual motion motor actuator capable of ±/9 mm of linear displacement and ±/12 degrees of rotational displacement. The rotary force output is rated for a relatively low level (i.e. 50 lb./in.) since the gearbox rail crossover motion (motion between the shift planes) is of a low force level. The linear component of the actuator is of a higher force (i.e. up to 400 lbs.) to accommodate the higher forces required during gear synchronization and engagement. After careful consideration, shift system 10 in the preferred embodiment used an electromechanical actuator, as opposed to a hydraulic actuator, due to the lack of a sufficient hydraulic source already in the vehicle (clutch supply not sufficient for both systems), to minimize pump noise (although only a demo vehicle, this noise may still be objectionable to a customer during a test ride) and to maintain a fluidless add-on system. One skilled in the art will readily recognize that hydraulic or other types of actuators may also be used in the present invention.

From the drivers perspective, important aspects of performing a complete shift (from one gear through neutral into the next selected gear) include shift time and shift perception. For shift system 10 to be acceptable to the driver, the shift times must be equal to or faster than a normal driver operated mechanical shift. That is, when the driver moves the shift lever, the gearbox must follow, without delay, according to the lever's motion. For the first preferred embodiment, a target of 400 milliseconds maximum (worst case) was initially set to accomplish this feat. This total time was broken down into the main subcomponents:

| Maximum Shift Breakdown Times | |
|---|---|
| Shift Out of Gear to Neutral: | 70 msec |
| Crossover (If Needed): | 50 msec |
| Neutral to Synchronization Start: | 20 msec |
| Synchronization of Selected Gear: | 200 msec |
| Engagement of Selected Gear: | 60 msec |

The synchronization time of 200 ms is a worst case figure, such as a skip shift from 5th to 1st gear. Most synchronization times from the first preferred embodiment of the present invention were faster than 200 milliseconds. A 4th to 5th gear shift was accomplished with complete gear to gear shift times under 200 milliseconds. Shift perception includes not only the perceived time for a shift, but also the pleasibility of the shift. Faster synchronization time can be achieved with fully applied synchronization forces, but consequences include various harsh engagement sounds ("clunking") and synchronizer abuse. The vehicle conditions present during the shift determine the shift force applied.

Transmission control module 20 addresses actuator control and shift control, as well as performs shift force calculations and protection routines. Transmission control module 20 is a microcontroller-based module that contains the appropriate A/D channels, timers counters, digital inputs, pulse width modulators (PWMs) and EPROM. On board MOSFET H bridge drivers provide bidirectional control of the linear and rotary portions of the actuator. For testing, an SCI interface is provided for communication to a laptop computer which allows for easy in-vehicle testing, calibration and parameter modification.

Transmission control module 20 calculates the optimum shift force required for actuator 24 to synchronize the gear within specified times. The standard formula used in the calculation is:

$$F_s = S1 - S2 \frac{I_r \times \sin\Phi \times (0.1047 \text{ rad/sec} - \text{rpm})}{t_s \times \mu \times R_c} K_t \quad (1)$$

where:

$F_s$=Synchronization Force
$I_r$=Reflected Inertia of Selected Gear
$\mu$=Dynamic Coefficient of Friction
$\phi$=Synchronizer Cone Angle
$R_c$=Synchronizer Mean Cone Radius
S1=Selected Gear Speed Before Synchronization (Input Shaft Speed Divided By Gear Ratio)
S2=Selected Gear Speed After Synchronization (Output Shaft Speed)
Kt=Temperature Compensation Term
$t_s$=Desired Synchronization Time For NV3500 manual transmission 60 of the first preferred embodiment, the synchronizer cone angle φ is 6.5 degrees and $R_c$ for the five synchronized gears is 41.61 mm. Depending upon the vehicle condition and the desired operation mode, the value of $t_s$, can vary from the maximum 200 milliseconds down to the minimum which is set by a combination of the synchronizer material properties and shift engagement NVH.

$K_t$ is normally a linear variable that is inversely proportional to the oil temperature in the gearbox. Since an analog sensor of the temperature is more expensive than a thermal switch, the temperature variation is broken down into two ranges, above and below 30° F. Below this temperature, the oil's viscosity increases and the $K_t$ term used is 1.25 to compensate for the additional shift force required for synchronization within the desired timeframe. Above 30° F., the value of $K_t$ used is 1.0. One skilled in the art may choose to implement more than 2 temperature ranges. It is also envisioned that a discrete temperature sensor could be used, and therefore the precise temperature could be factored in to the force calculation.

To obtain a formula that results in the total shift time given the programmed shift force, equation (1) can be solved for $t_s$, as follows:

$$t_s = \frac{I_r \times \sin\phi \times (S2 - S1)}{\mu \times R_c \times F_s} \quad (2)$$

When optimizing shift times for speed, this equation can be used with the programmed shift force $F_s$ to calculate the total synchronization times.

Figure 4A:
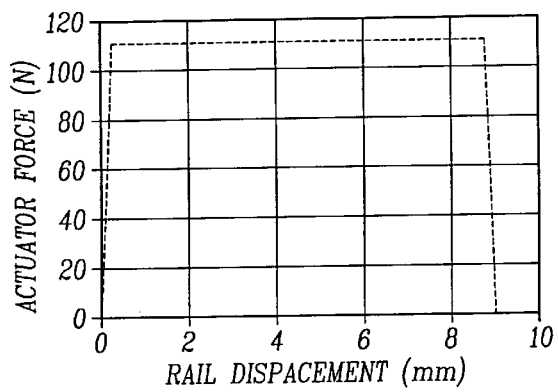
FIG. 4A shows a shift force used to shift the gearbox into neutral from an in-gear position using the shift system of the present invention.
Figure 4B:
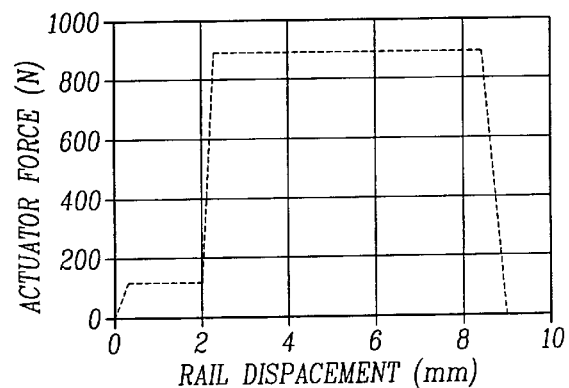
FIG. 4B shows a shift force used to shift the gearbox from neutral to an in-gear position using the shift system of the present invention.
Figure 5:
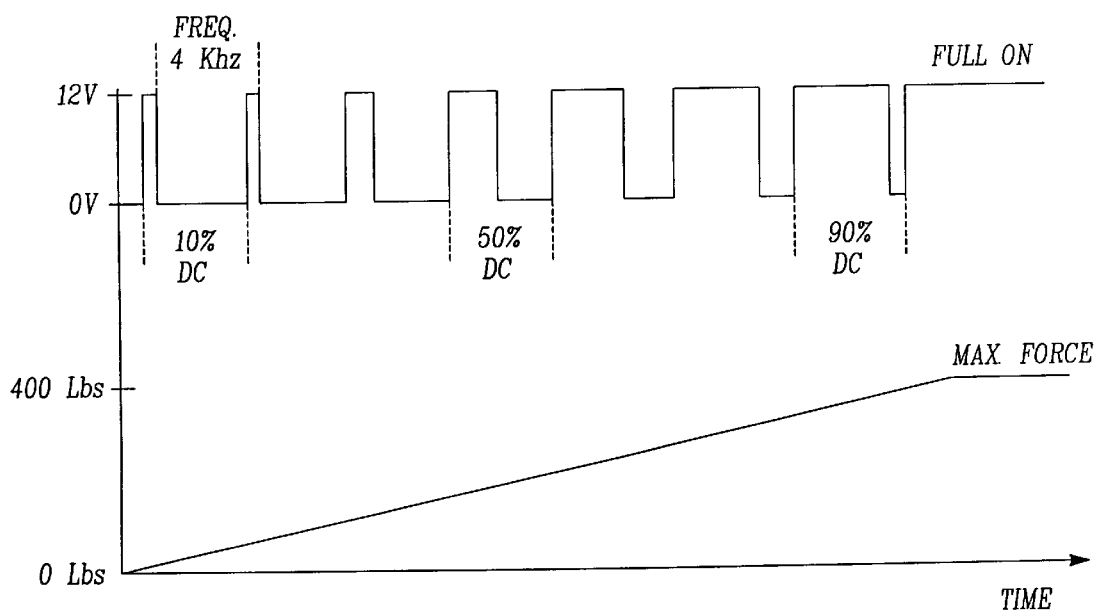
FIG. 5 is a diagram showing force control of an actuator using pulse width modulation in the shift system of the present invention.

For the present invention, FIG. 4A shows a typical shift force used to shift the gearbox into neutral from an in-gear position. Note that this shift force is a constant over the entire distance from the in-gear position to neutral. This is due to the light load seen during this type of shift. FIG. 4B shows the shift force map used when shifting from neutral to an in-gear position. While the force level changes according to the vehicle and gearbox conditions, the shape of the curve is consistent for all synchronized shifts. Initially an entry force (e.g., 100 lbs.) is applied by actuator 24 to shift rail 62 for moving the shift sleeve 354 and synchronizers to take up synchronizer clearance (the first 2 mm of rail travel). At this time, the calculated synchronizer force is used throughout most of the completion of the shift. An lesser end force (e.g., 50 lbs.) is applied near the end of travel to avoid running into the end of travel on the shift rail. The synchronization force, as seen in FIG. 4B (between 2 mm and 8.25 mm), is calculated by transmission control module before each shift. A proportional amount of force is then applied to actuator 24 using PWM (pulse width modulation) as seen in FIG. 5. Full actuator power (100% duty cycle) is never used in shift system 10.

Figure 6:
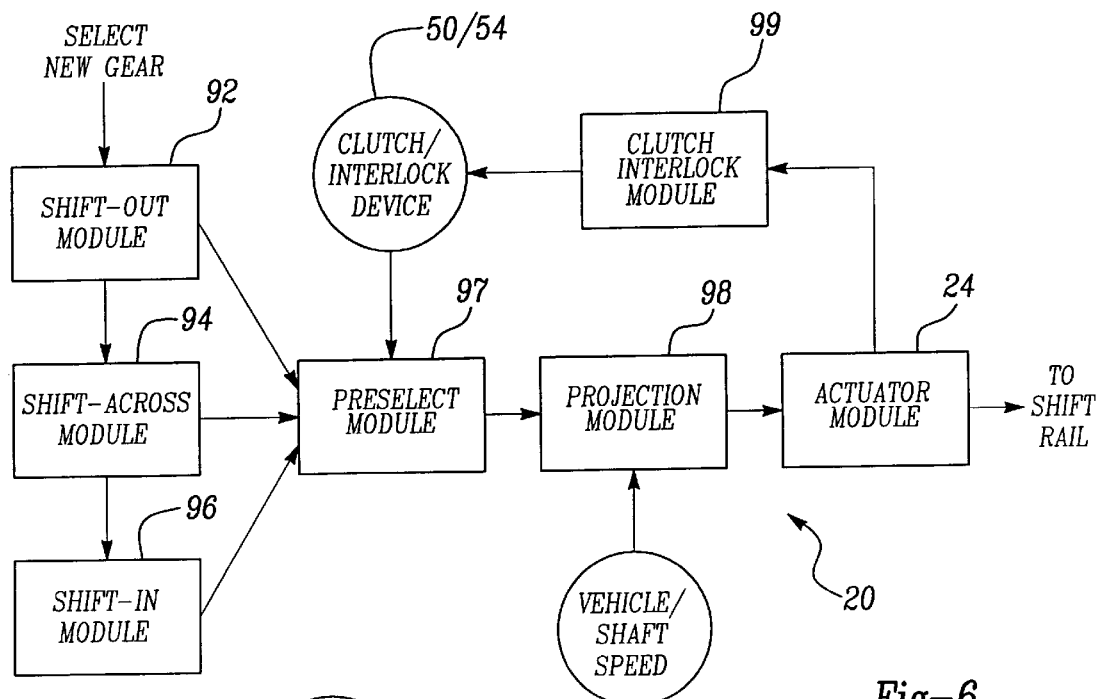
FIG. 6 is a block diagram showing the primary components of a transmission control module of the shift system of the present invention.
Figure 7:
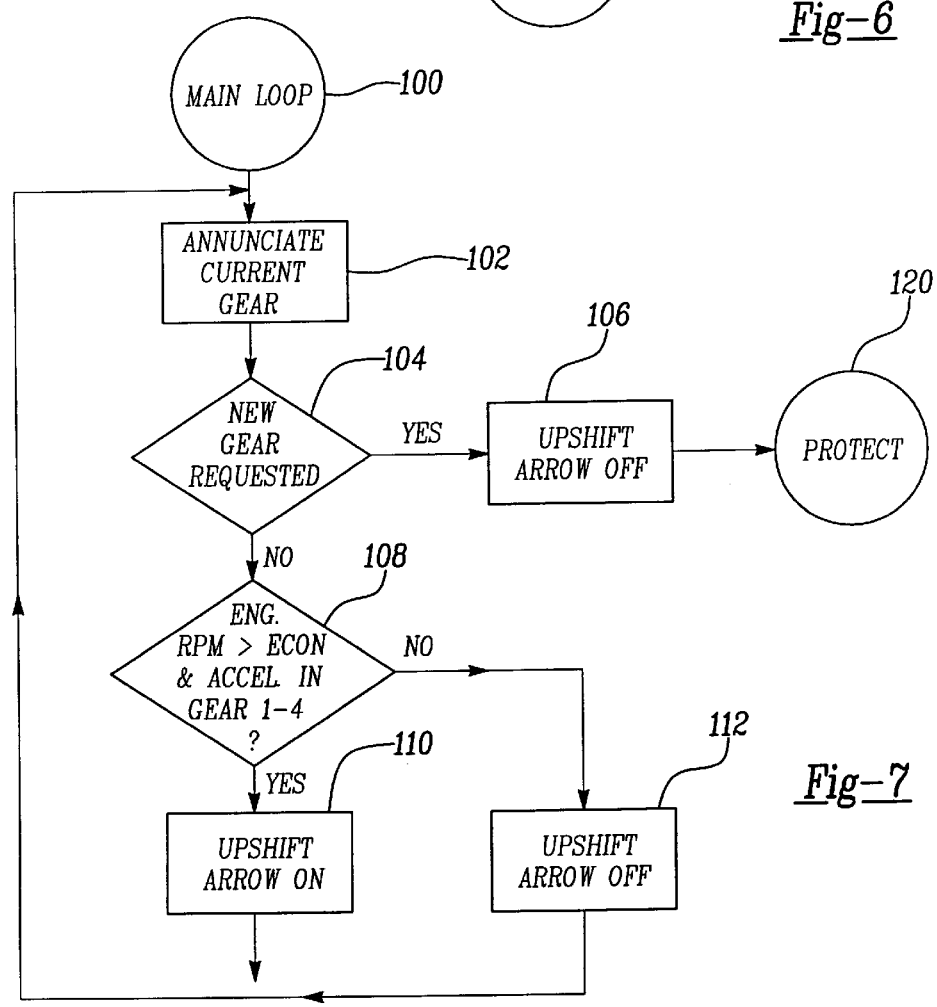
FIG. 7 is a flowchart showing the steps for the main loop processing of the transmission control module of the present invention.

An overview of the primary components of transmission control module 20 are shown in FIG. 6. A shift-out module 92 receives an electrical input signal indicative of a selected gear from shift lever 26. To perform a complete shift, shift rail 62 must first be actuated from its current in-gear position to a neutral position based upon an electrical signal transmitted by shift-out module 92. Next, a shift-across module 94 will (if necessary) transmit an electrical signal to rotate shift rail 62 to another neutral position that aligns with the in-gear position for the selected gear, and a shift-in module 96 will transmit an electrical signal to actuate shift rail 62 into selected in-gear position. As previously discussed, shifting in specifically involves 3 actuation forces, such that PWM varies to include a first electrical signal indicative of an entry force, a second signal indicative of the calculated synchronization force, and a third electrical signal indicative of an end force.

A preselect module 97, connected to clutch 50, prevents the transmission of these actuation signals until clutch pedal 52 has been depressed. In addition, a protection module 98 monitors the shaft(s) speed and vehicle speed, and then determines a shift condition by comparing these speed values to predetermined speed values. During an unacceptable shift condition, protection module 98 prevents transmission of these actuation signals to actuator 24. Lastly, a clutch interlock module 99 connects to clutch interlock device 54 and monitors actuation of shift rail 62, and thus prevents clutch release before shift rail 62 engages the selected gear.

Shifting preselect, protection measures and clutch interlock are each discussed in greater detail. Shifting preselect allows the driver to choose the next desired gear to be engaged using shift lever 26. The preselected gear is chosen by shifting the gear shift lever to the desired position without the clutch pedal being depressed. Since the clutch is not yet depressed, shift system 10 takes note of the desired gear and waits for the clutch signal to indicate the clutch has been disengaged. This preselection can be at any time, while in any gear, and with the vehicle going at any speed. The option was added to aid in implementing an automated manual transmission.

Once the new gear is selected, driver display 30 will continue to display the currently engaged gear, while indicating the new selected gear using a flashing indicator. Once the clutch is disengaged, shift system 10 automatically proceeds to complete the desired shift. When clutch pedal 62 is depressed half way, preselect module 97 instructs actuator 24 to shift out of gear to neutral. When clutch pedal 62 reaches the fully depressed state, the completion of the shift is made by engaging the preselected gear. Throughout this sequence, protection module 98 is constantly monitoring the vehicle and gearbox (ie. vehicle speed, shaft speed) for safe operating conditions.

An audible beep indicates to the driver the completion of the shift, which tells the driver that clutch 50 can be engaged. The purpose of starting the shift sequence when clutch pedal 52 is only half depressed is to give the appearance of a faster perceived shift. Shifting out of gear as clutch 50 is being released does not present a danger to either the driver or gearbox.

With a software control approach, protection measures are easily implemented into transmission control module 20. The primary concern for a manually initiated shift system is shifting into gears when conditions are not safe, either for the driver or the mechanics of the gearbox. With powerful actuators, the driver has little recourse once a shift has been commanded.

Down shifts are a major cause of synchronizer abuse and excessive wear. For an example, a downshift from 5th gear to 1st at 55 mph would cause the synchronizers to be overloaded, with possible clash. Protection module 98 monitors vehicle speeds and selected gears to ensure that unsafe shifts are never initiated, thereby overriding shift lever commands. For the present invention, transmission control module 20 will only allow engagement of the following gears when the transmission output shaft is within the following ranges:

Safe Gear Engagement Range (Output Shaft RPMs)

1st Gear: 0 to 1250 rpms

2nd Gear: 0 to 2150 rpms

3rd Gear: 575 to 3575 rpms

4th Gear: 800 to 5000 rpms

5th Gear: 1100 to 6850 rpms

Reverse Gear: 0 to 300 rpms

Electronic controls also allow for a reverse gear blockout device without the need for additional mechanical components. The traditional spring and cam components are no longer required. This function is accomplished by monitoring the vehicle speed and shaft speeds of the transmission. If the vehicle is moving forward with a rear output shaft of greater than 300 rpm, then the control logic does not allow the actuator to engage the reverse gear.

Some transaxles and transmissions do not have synchronizers on the reverse gear, mainly as a cost saving measure. Consequently, when shifting quickly from a rolling stop into reverse, clash will occur due to the output shaft still rotating slightly or due to the input shaft still rotating slightly. Transmission control module 20 track both shaft speeds (input and output) to ensure the shift into reverse is not made during these clash conditions.

A clutch interlock feature has also been included into the system to prevent inadvertent and concurrent clutch engagement and shift engagement. Since the driver maintains control of clutch 50, the module must ensure that driver errors do not compromise system safety. A clutch interlock device 54 is a clutch solenoid that is inserted between clutch pedal 52 and clutch 50. Two clutch switches are used to determine when clutch pedal 52 is approximately half depressed and also when clutch 50 is nearly fully depressed. It is also envisioned that clutch interlock device may be a hydraulic valve with a one-way bypass or other similar device that will allow the driver to further depress the clutch if the interlock is activated.

Clutch interlock module 99 senses the continuous position of the shaft rail and activates clutch interlock device 54. It will only allow the gear shift to initiate when the clutch pedal 52 is fully depressed. If gear engagement has been initiated and clutch pedal 52 is then released, clutch interlock device 54 will either prevent the clutch from being released, or will slow the release of the clutch to allow the shift to complete. This device contains a check valve to allow clutch 50 to be depressed even when clutch interlock device 54 is activated. It will not interfere with the driver's operation of clutch 50.

FIGS. 7–16 are flowcharts showing a more detailed implementation of transmission control module 20 in a first preferred embodiment of the present invention. Start block 100 signifies the beginning of the main loop processing. Block 102 annunciates the current gear. Decision block 104 determines whether a new gear has been requested as indicated by an electrical input signal from shift lever 26. If a new gear has been selected, then block 106 turns off the upshift arrow indicator on driver display 30, before proceeding protection routine 120. If a new gear has not been selected, then decision block 108 will determine whether an upshift is needed. If shaft speed exceeds some predetermined criteria indicative of the need to shift to the next highest gear, then block 110 turns on the upshift arrow indicator; otherwise block 112 turns off the upshift arrow indicator, but in either case flows goes back to main loop processing at block 100.

Figure 8:
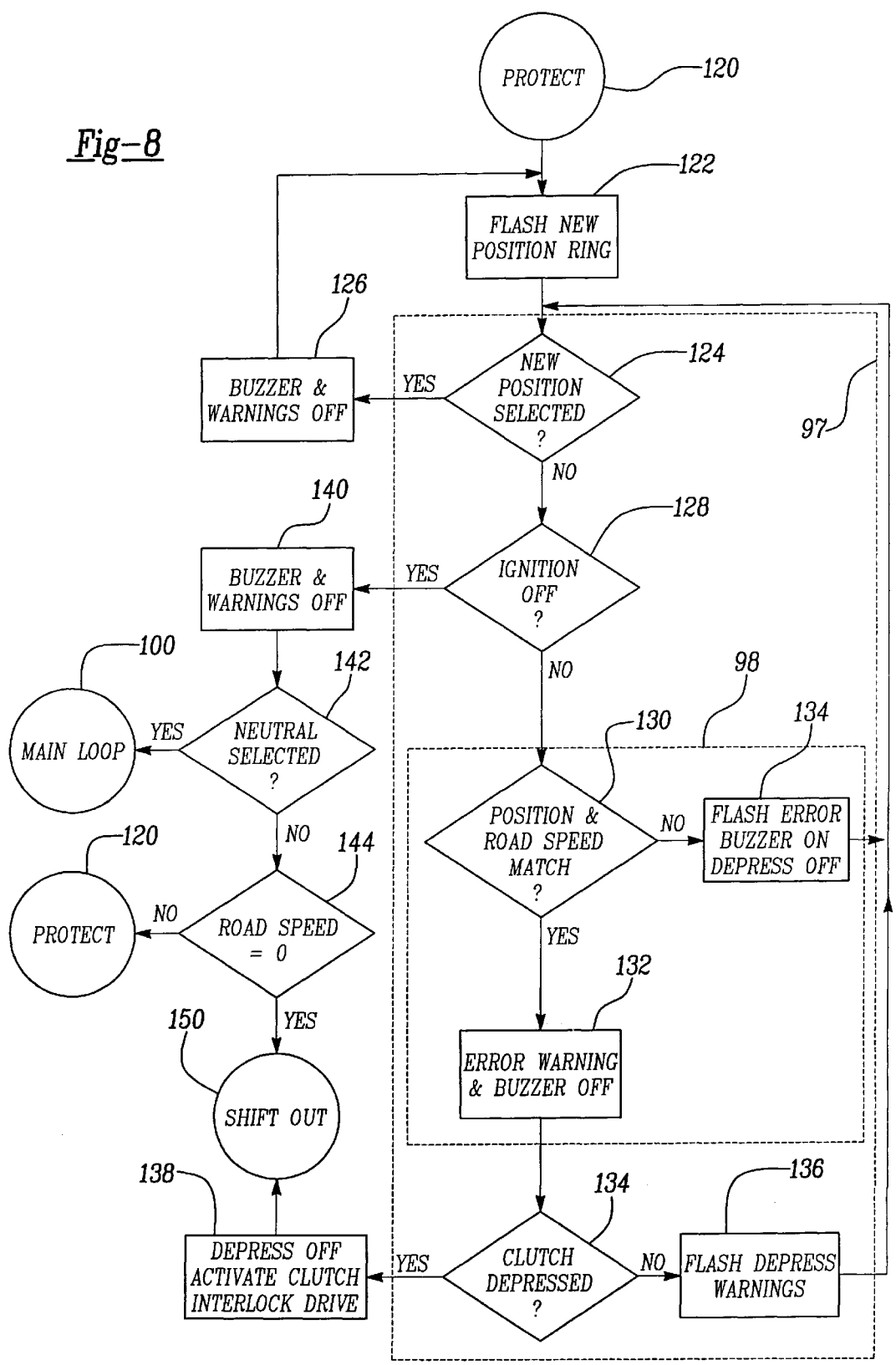
FIG. 8 is a flowchart showing the steps for the shifting preselect and protection measures processing of the transmission control module of the present invention.

Referring to FIG. 8, protection routine 120 includes the processing for protection module 98 and preselect module 97. Block 122 turns on the visual indicator for the selected gear by flashing the ring around the corresponding gear on driver display 30. Decision block 124 facilitates preselect shifting by reevaluating whether a new gear has been requested. If a new gear has been selected, then shift completion buzzer and other shift warnings are turned off in block 126 before continuing processing at block 122. On the other hand, if a new gear has not been selected, then decision block 128 determines the status of the vehicle ignition. When the ignition is on, protection measures are implemented in decision block 130. As previously described, protection measures of block 130 evaluates the shift conditions by comparing shaft speed and vehicle speed with predetermined values for the selected gear. If shaft speed and vehicle speed falls within the acceptable predetermined ranges, then block 132 turns off the shift completion buzzer and other error warnings before the shifting process is allowed to proceed; otherwise the visual error symbol is turned on and the depress clutch symbol is turned off on driver display 30 in block 134. Due to this unacceptable shift condition, processing from block 134 returns to block 124.

Block 132 continues the shifting process in decision block 134 which evaluates clutch status. Since the shifting will not occur until the clutch pedal is depressed (in an acceptable shift condition), then a driver can preselect the next desired gear using the shift lever. If the clutch is not depressed and an acceptable shift condition occurs, then block 136 flashes the depress clutch symbol and returns processing to block 124. This looping logic allows the driver to preselect the next desired gear. Conversely, if the clutch pedal has been depressed under an acceptable shift condition, then block 138 turns off the depress clutch symbol and activates the clutch interlock device. The physical shifting process begins in shift-out routine 150.

Returning to block 130, when the ignition is off, shift completion buzzer and other shift warnings are turned off in block 140. Next, decision block 142 determines whether the next selected gear is neutral, and if so returns to the main loop routine in block 100. If the next selected gear is not neutral and the vehicle speed is zero, then decision block 144 directs the flow to the protection routine of block 120; whereas if vehicle speed is not zero, then processing continues in shift-out routine 150.

Figure 9:
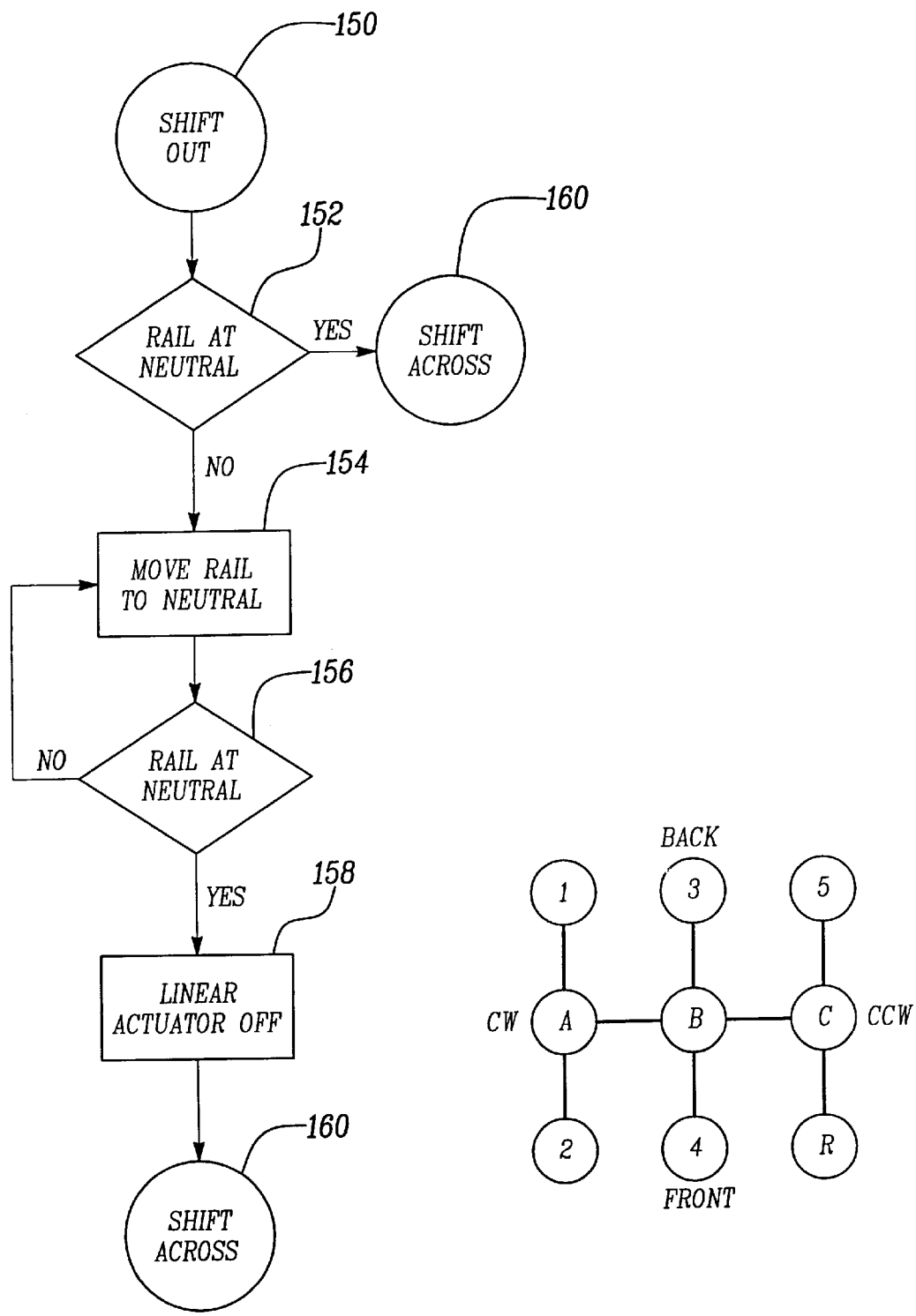
FIG. 9 is a flowchart showing the steps for the shift-out processing of transmission control module of the present invention.
Figure 16:
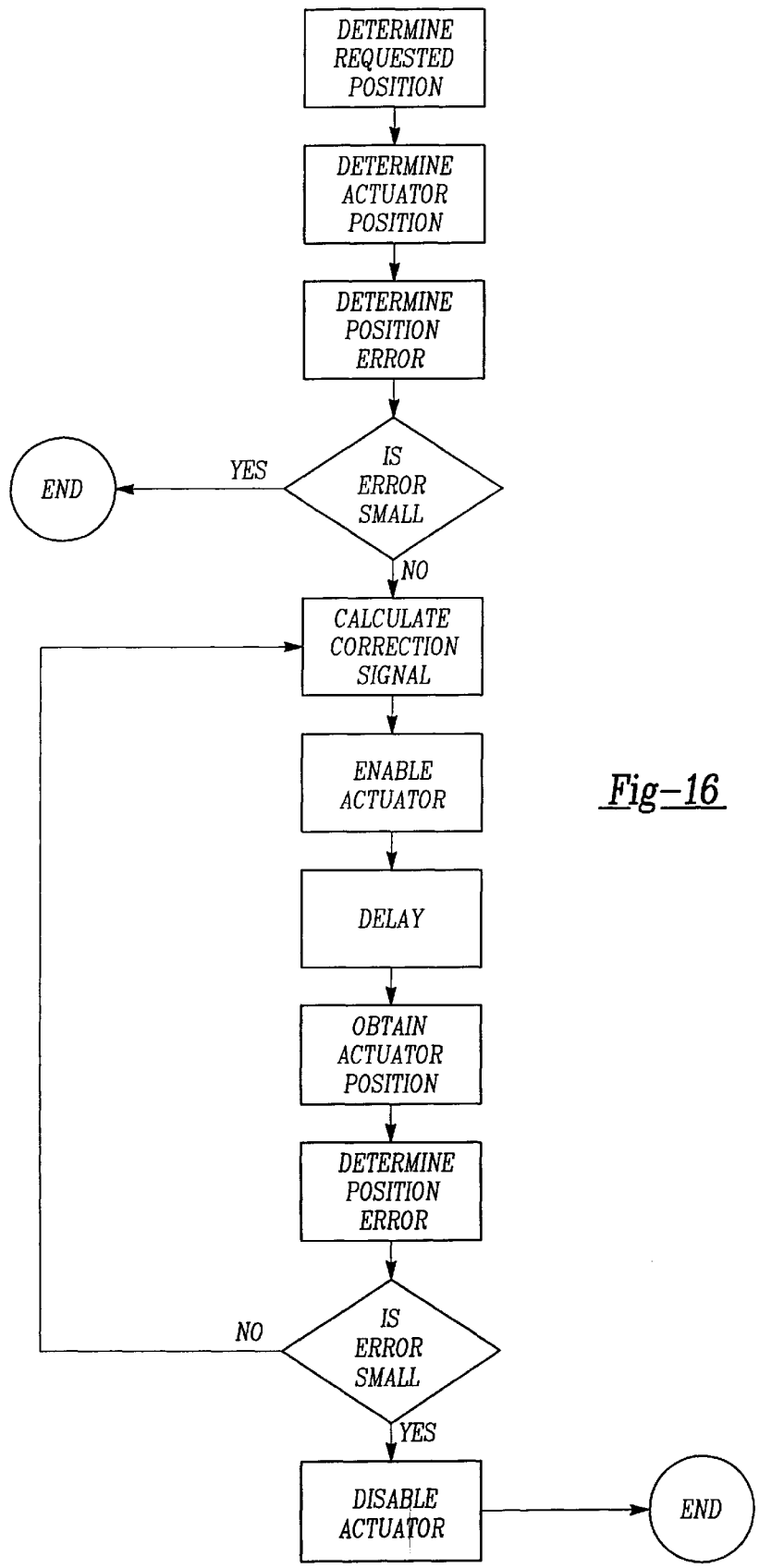
FIG. 16 is a flowchart showing the steps a proportional derivative control scheme used by the shift system of the present invention.

Shift-out routine 150, as shown in FIG. 9, generates the signal to actuate the shift rail from its current in-gear position to a neutral position. Decision block 152 determines if shift rail is in a neutral position, and if so moves to shift across routine 160. However, if the shift rail is not in a neutral position, then an electrical signal is transmitted to move shift rail to a neutral position in block 154. Decision block 156 ensures that shift rail has reached its targeted neutral position, before terminating the electrical signal being sent to actuator 24 in block 158. A proportional derivative control scheme, as seen in FIG. 16, is used to achieve actuator position at its target neutral position. Block 158 continues the shift process in shift-across routine 160.

Figure 10:
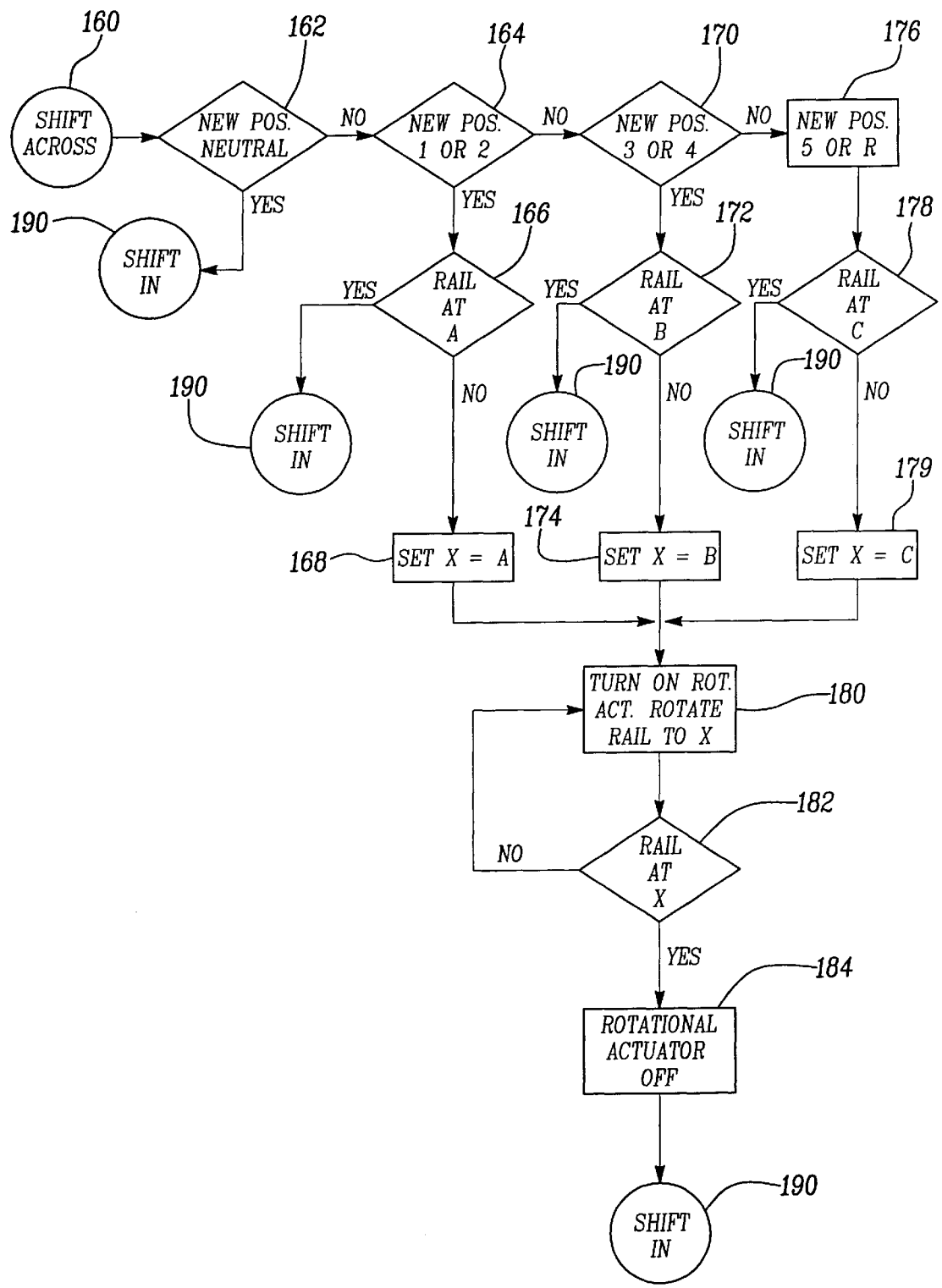
FIG. 10 is a flowchart showing the steps for the shift-across processing of the transmission control module of the present invention.

In FIG. 10, shift-across routine 160 transmits an electrical signal (if necessary) to rotate shift rail to another neutral position that aligns with the in-gear position for the selected gear. For example, if shift rail is currently in neutral position B (corresponding to 3rd and 4th gears), then it must be rotated clockwise into neutral position A if the selected gear is either 1st or 2nd gear. Decision block 162 determines if the selected gear is neutral, and if so (since shift rail need not be actuated) moves to shift-in routine 190. However, if the shift rail is not in a neutral position, then decision block 164 determines if new selected gear is 1st or 2nd gear. If the selected gear is 1st or 2nd gear, then decision block 166 determines if shift rail is in neutral position A. If the shift rail is currently at neutral position A, then processing moves to shift-in routine 190; otherwise neutral position is set to (X=)A in block 168 and processing continues at block 180. If the selected gear is not 1st or 2nd gear, then decision block 170 determines if the selected gear is 3rd or 4th gear. If the selected gear is 3rd or 4th gear, then decision block 172 determines if shift rail is in neutral position B. If the shift rail is currently at neutral position B, then processing moves to shift-in routine 190; otherwise neutral position is set to (X=)B in block 174 and processing continues at block 180. If the selected gear is not 3rd or 4th gear, then block 176 assumes the selected gear is 5th or reverse gear. Decision block 178 determines if shift rail is in neutral position C. If the shift rail is currently at neutral position C, then processing moves to shift-in routine 190; otherwise neutral position is set to (X=)C in block 179 and continues processing at block 180.

Block 180 transmits an electric signal to rotate shift rail to the position x has been set. Decision block 182 ensures that shift rail has been rotated to the x position and if not returns processing to block 180. Again, a proportional derivative control scheme, as seen in FIG. 16, is used to achieve actuator position at its target neutral position. After shift rail reaches the x position, then actuator is turned off in block 184 before moving to shift-in routine 190.

Figure 11:
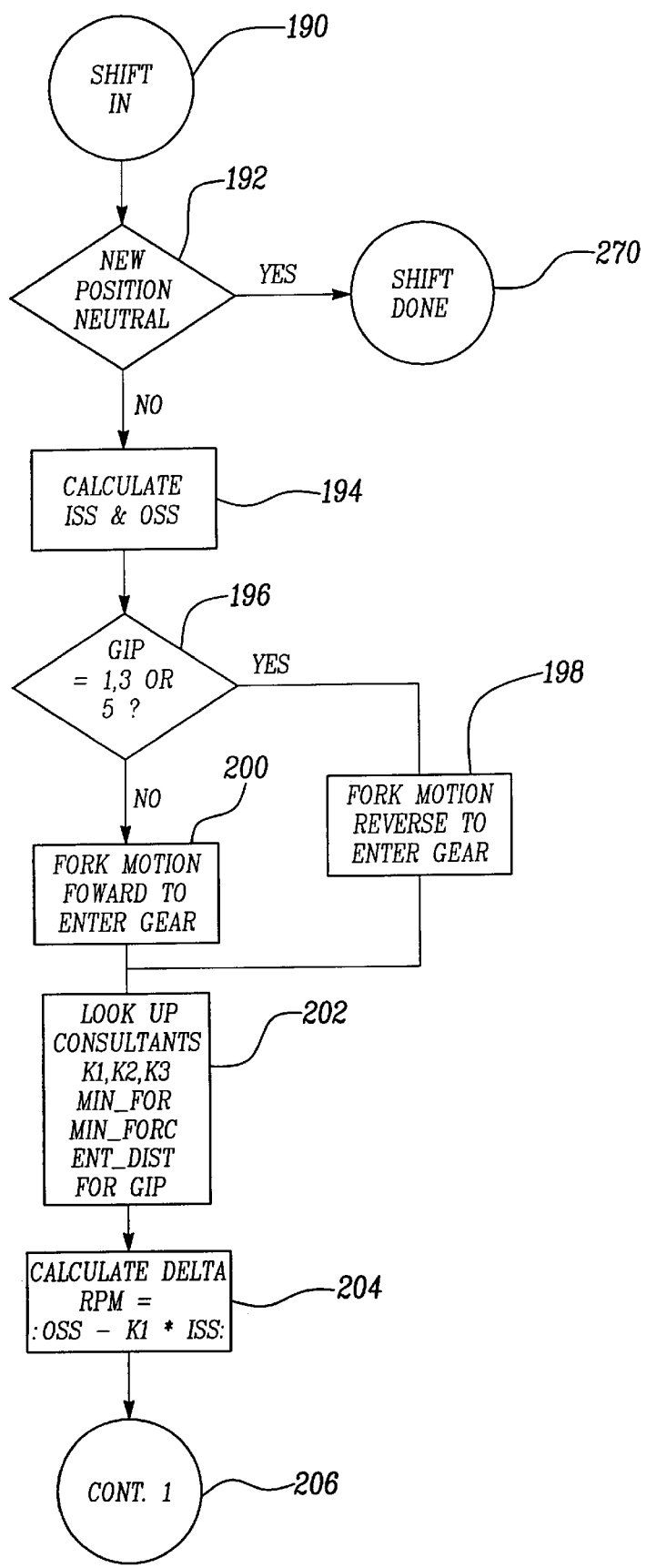
FIGS. 11, 12 and 13 are flowcharts showing the steps for the shift-in processing of the transmission control module of the present invention.
Figure 12:
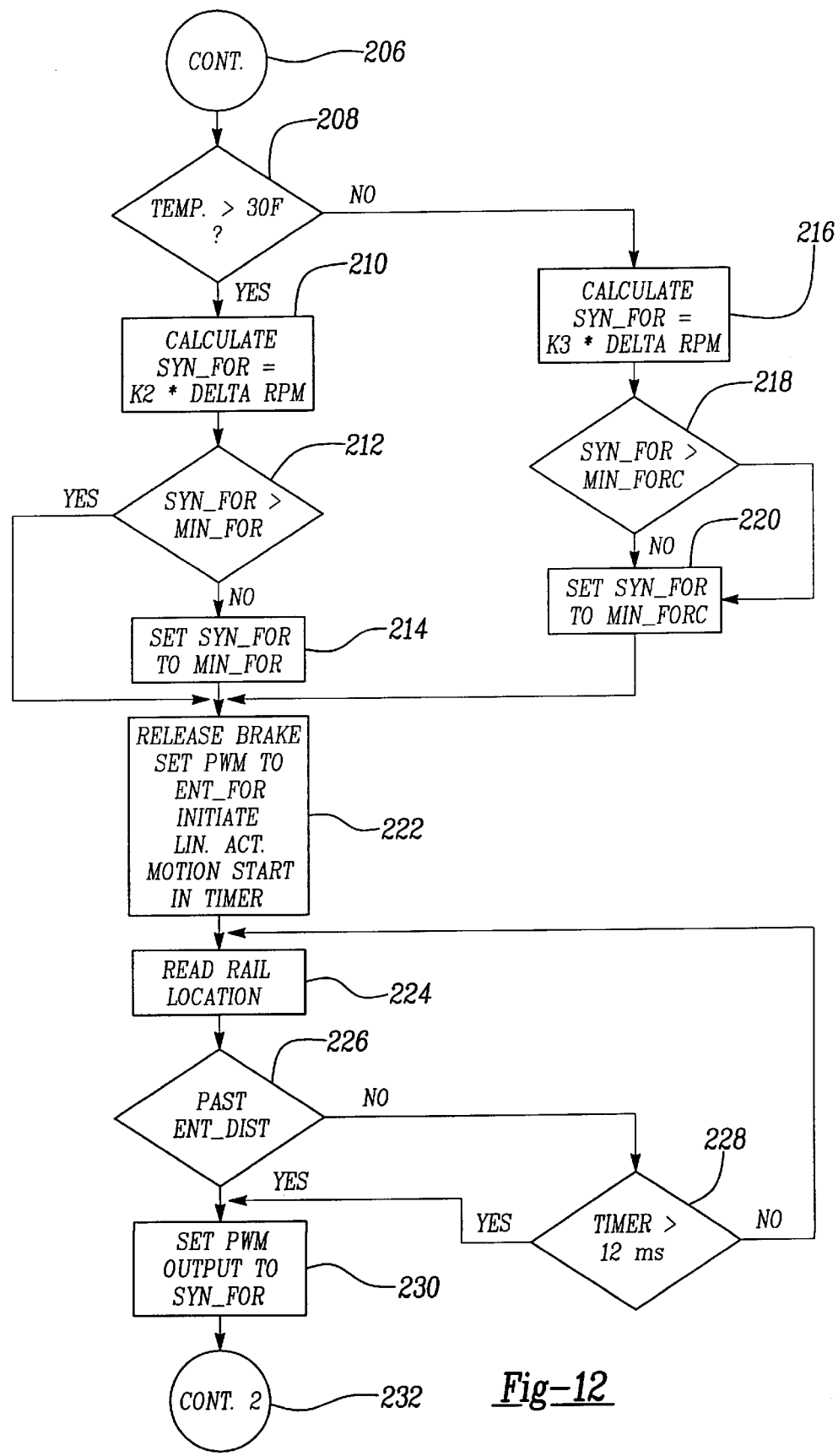

Referring to FIG. 11, shift-in routine 190 generates signal to actuate shift rail into selected in-gear position. Decision block 192 determines if selected gear is neutral, and if so (since shift rail need not be actuated) moves to shift done routine 270. However, if the selected gear is not neutral, then input shaft RPM (ISS) and output shaft RPM (OSS) is calculated in block 194. Based on which gear has been selected, decision block 196 determines if fork motion of actuator will be forward or reverse to enter gear. In block 198 fork motion is set to reverse (when selected gear is 1, 3 or 5), whereas in block 200 fork motion is set to forward; but in either case processing continues in block 202. Block 202 looks up various constants, including speed constant (K1), force constant above 30° (K2), force constant below 30° (K3), minimum sync force, etc., which are stored in an EPROM associated with transmission control module 20. Block 204 calculates the RPM differential between input and output shaft before continuing processing in block 206 of FIG. 12.

Following block 206, decision block 208 evaluates the oil temperature of the vehicle's engine. If the oil temperature exceeds 30° F., then block 210 calculates the synchronization force using K2. Next, decision block 212 determines if this calculated synchronization force exceeds a predetermined minimum force value. If so, then processing proceeds to block 222; but otherwise synchronization force is set to this minimum force in block 214 before moving to block 222. Similarly, when oil temperature is below 30° F., then block 216 calculates the synchronization force using K3. Decision block 218 determines if this calculated synchronization force exceeds a minimum force value and if so, then proceeds to block 222. If not, synchronization force is set to this minimum force in block 220 before moving to block 222. In block 222, a shift-in timer is set, the shift rail brake is released and PWM is set to begin linear actuation of shift rail at a predetermined entry force. A sensor retrieves shift rail position in block 224 for an evaluation of the shift rail position with respect to a predefined entry distance in decision block 226. If the shift rail is beyond this entry distance, then processing moves to block 230; otherwise decision block 228 looks to elapsed shift-in time. If the elapsed time is less than 12 ms, then processing returns to block 224, but if elapsed time is greater than 12 ms, then proceed to block 230. Block 230 begins applying the calculated synchronization force to the shift rail by setting PWM output to the corresponding output value. Block 232 provides the transition to FIG. 13.

A sensor retrieves shift rail position in block 234 for an evaluation of the shift rail position with respect to a predefined synchronization distance in decision block 236. If the shift rail has not yet achieved this distance, then decision block 238 evaluates elapsed shift-in time. An elapsed time less than 400 ms returns processing to block 234, but otherwise the elapsed time indicates an error in the shifting process and thus flows to decision block 240. In block 240, an elapsed time of less than 480 ms discontinues PWM output in block 242 before returning to block 234. However, an elapsed time that exceeds 480 ms proceeds to decision block 244. Again, elapsed shift-in time is evaluated with an elapsed time less than 860 ms setting PWM output to a maximum value in block 246 before returning to block 234; otherwise processing proceeds to block 264. Block 264 turns off PWM, sets brake, releases clutch interlock device and resets shift-in and end timers, before returning to the main loop routine in block 100.

Once the shift rail has reached the synchronization distance, block 250 begins an end timer and sets PWM output to produce an end force that is the final force to move the sleeve into the gear. A sensor retrieves shift rail position in block 252 for an evaluation of whether the shift rail has engaged the selected gear in decision block 254. If the selected gear is engaged, then block 256 turns off PWM, sets brake and resets shift-in and end timers, before proceeding to shift done routine 270. If the selected gear is not engaged, then decision block 258 evaluates the elapsed shift-in time. Processing proceeds to block 264 if time exceeds 980 ms, but otherwise moves to decision block 260 to evaluate end time. If elapsed end time exceeds 100 ms, block 262 sets PWM output to generate a higher end force (i.e., 200 lbs.) that ensures the gear is engaged, and then returns to block 252; but otherwise returns directly to block 252.

Figure 13:
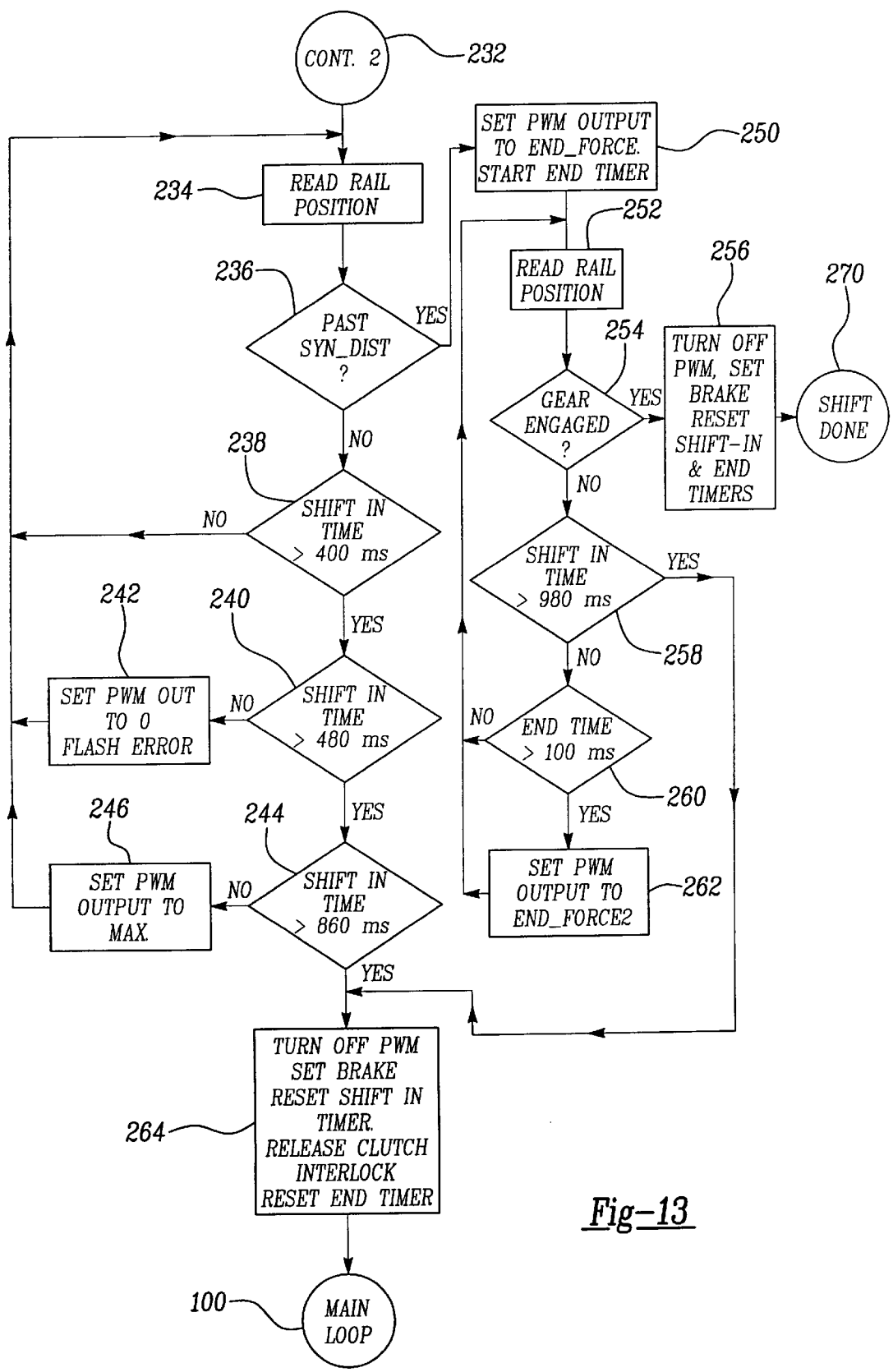
Figure 14:
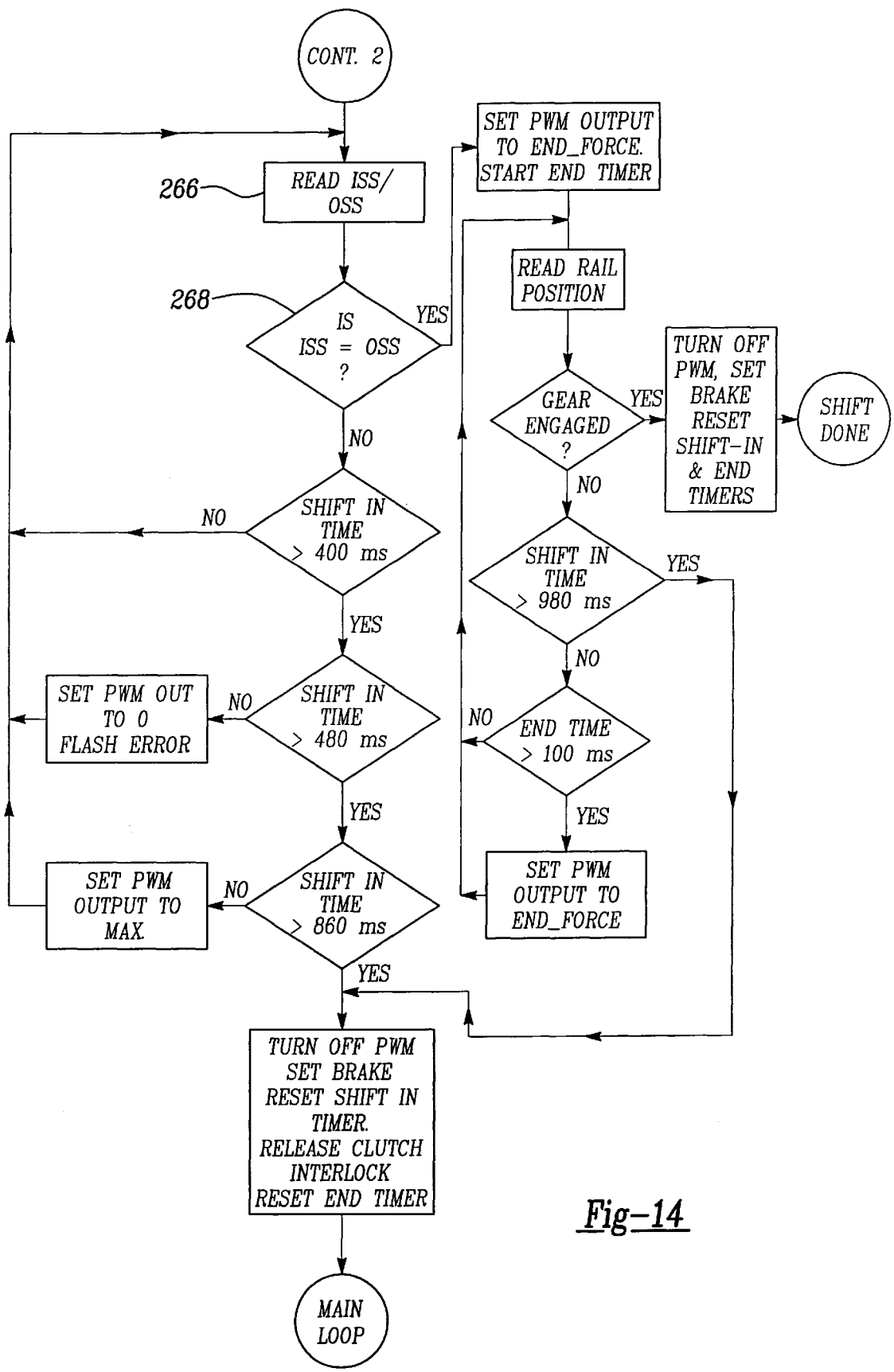
FIG. 14 is a flowchart showing an alternative embodiment for a portion of the steps for the shift-in processing of the transmission control module of the present invention.

An alternative embodiment for the above described process of FIG. 13 is shown in FIG. 14. Identical processing occurs in this embodiment, except as seen in blocks 266 and 268 (similar to blocks 234 and 236, respectively, in FIG. 13). Rather than focusing on shift rail displacement, this approach compares input shaft speed with output shaft speed to determine when synchronization occurs. A sensor retrieves input and output shaft speeds in block 266 for a comparison of these values in decision block 268, but otherwise processing continues as discussed in FIG. 13.

Figure 15:
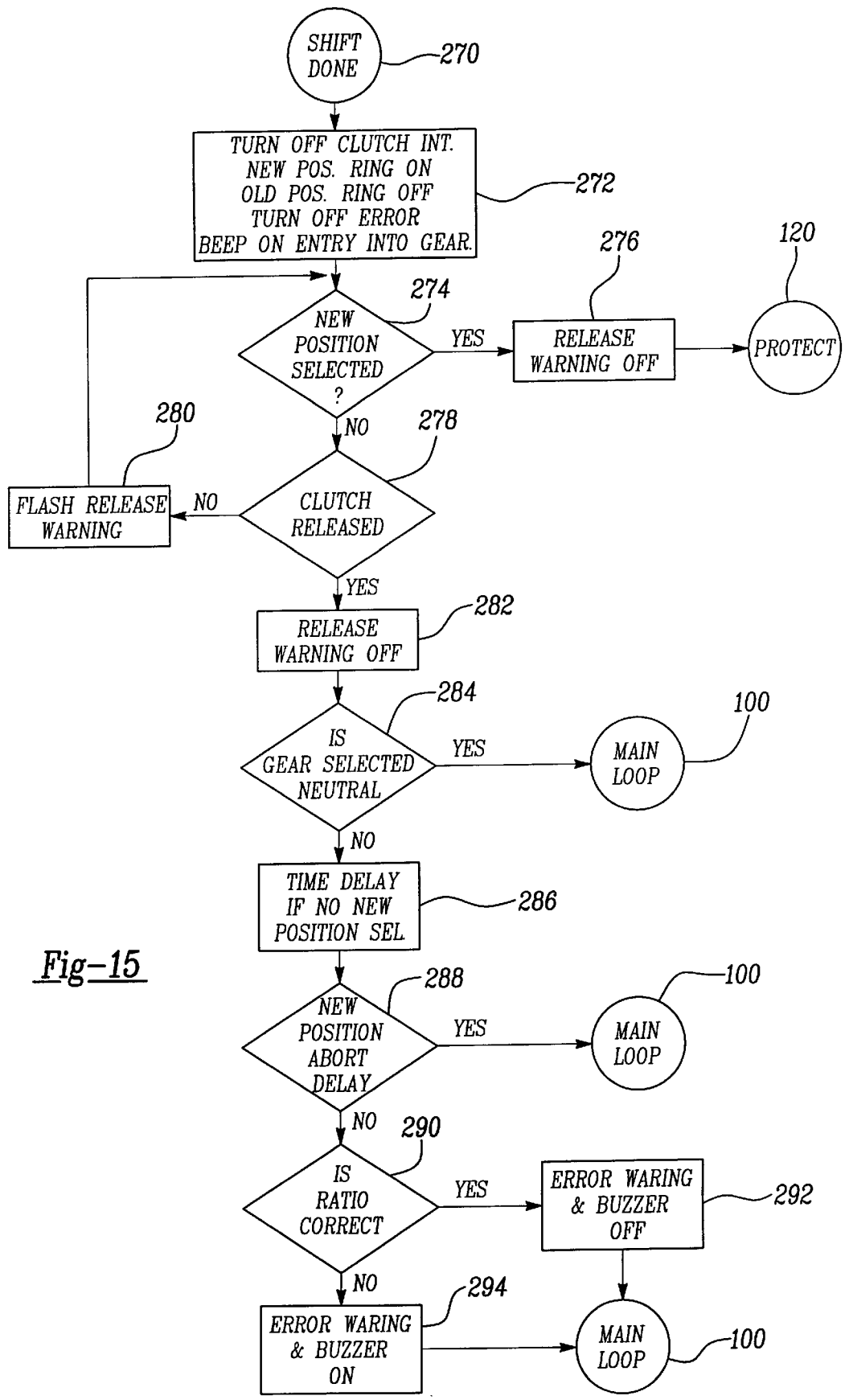
FIG. 15 is a flowchart showing the steps for the shift done processing of the transmission control module of the present invention.

The gearshift is physically complete, but there are some overhead functions that must be completed in shift done routine 270 as shown in FIG. 15. Block 272 turns off clutch interlock device, turns off error indicator, generates an audible signal from shift completion buzzer, turns off the visual indicator for previously selected gear and turns on visual indicator for currently selected gear. Decision block 274 determines if a new gear has been selected. If a new gear has been selected then clutch release warning is turned off in block 276 and processing continues in protection routine 120; but if not, the clutch status is checked in decision block 278. When the clutch has not been released, a release clutch warning is flashed to the driver in block 280 and processing returns to block 274. However, when the clutch has been released, clutch release warning is turned off in block 282. If the previously selected gear was neutral as determined by decision block 284, then processing returns to the main loop routine in block 100; otherwise a time delay is provided in block 286 to allow the clutch to engage and the driveline to settle out. If a new gear is selected during this time delay, decision block 288 aborts the delay and returns to main loop routine in block 100. If no new gear is selected, the delay is not aborted and decision block 290 verify that the input and output speeds correlate to the engaged gear. If operating properly, then error warnings are turned off in block 292 and flow goes back to main loop routine 100; whereas if its not operating properly, then error warnings are turned on in block 294 before returning to main loop routine 100.

Finally, the synchronizer design must be carefully considered in any automated shifting scheme, and in particular for the shift system of the present invention. While a gearbox for normal mechanical shifting is designed for specified typical and worst case shift forces created by the driver and shift lever, the addition of hydraulic or electromechanical actuators can introduce shift forces above and beyond those seen by the original design. Failure to properly analyze the forces and energy densities seen at the synchronizer, can lead to premature synchronizer wear and clash conditions.

The ideal shift times for shift system 10 would be as small as possible, <50 ms for example. This would result in a system where there would be no perceived delay in how the transmission responds to driver commands given through the shift lever. In fully automated manual transmission systems, torque interruptions are very noticeable, especially compared with a conventional automatic transmission. To approach these somewhat ideal shift times, the synchronization times (only a part of the total shift time) would need to be very small. Using a powerful (hydraulic) actuator might accomplish this goal, with or without harsh engagement noises. However, if continuously high energy densities appear on the synchronizer cones for all shifts, excessive axial wear on the synchronizers will result in reduced life and performance.

Synchronizer wear is primarily a function of type of synchronizer friction lining material and energy density of the friction encountered. Some typical materials used are Brass, Paper, Molybdenum and Sintered friction linings. If higher than normal shift forces are present in shift system 10, then the type of synchronizer material should be reviewed. Brass has wear properties on the low end of performance curves, while sintered material has very good wear characteristics. The first embodiment of the present invention used the same synchronizer that was present in the production version of the transmission, which was sintered bronze. No additional concerns arose from the potentially higher shift forces that were used on shift system 10. If paper had been used, then the synchronizer design would need review.

It should be remembered that this shift system operates functionally as a mechanical manual transmission, and thus there is no electronic engine or electronic clutch control associated with this system. Therefore, when shifts are made, not only does the driver control the clutch, but the driver must also use the accelerator pedal during the shifts. Upon release of the clutch, the driver must still lift up on the throttle to prevent engine flare. It is envisioned that shift system 10 of the present invention may be integrated with an automatic clutch system and other engine control systems.

While specific embodiments have been shown and described in detail to illustrate the principles of the present invention, it will be understood that the invention may be embodied otherwise without departing from such principles. As will be apparent to one skilled in the art, shift system 10 may be incorporated into a various types of manual transmissions. For instance, a transmission employing a three rail design could utilize the same software control with slight modifications to send actuation signals to each of three actuators that are coupled to a corresponding rail. The number and type of actuator(s) used, as well as the integration with the clutch for the shift system of the present invention may vary depending upon the configuration of the transmission. In addition, mechanical modifications can be made to the gearbox to improve on shift times, including using dual cone synchronizers and improved actuators. For most automated manual applications, smaller gearboxes will be used than the one used for the shift system in the first embodiment. While this gearbox was targeted for a light truck, utility truck application, most automated manual applications are centered around the small and medium sized car platforms. This reduction in gearbox size means lower gear, shaft and clutch inertias, which translate into lighter synchronization loads. Additionally, actuator sizes are reduced. One skilled in the art will readily recognize from such discussion and from the accompanying drawings and claims that various changes, modifications and variations can be made therein without departing from the spirit and scope of the invention as described in the following claims.

In the claims:

1. An electronically controlled shift system for a transmission of a motor vehicle, having a shift lever for selecting a gear and an actuator, comprising:

an initiation module connected to said shift lever for receiving an electrical input signal indicative of said selected gear and for transmitting a first electrical signal indicative of an entry force;

a synchronization module connected to said initiation module for determining a synchronization force and for transmitting a second electrical signal indicative of said synchronization force;

a termination module connected to said synchronization module for transmitting a third electrical signal indicative of an end force, whereby the actuator actuates a shift rail of the transmission based upon said first signal, said second signal and said third signal;

a clutch connected to the transmission, having a clutch pedal and a clutch interlock device connected between said clutch pedal and said clutch; and a clutch interlock module connected to said clutch interlock device for preventing clutch release before said shift rail engages said selected gear by monitoring actuation of said shift rail.

2. The system of claim 1 further comprising:

a preselect module connected to the actuator and said clutch for preventing transmission of said first signal, said second signal and said third signal until said clutch pedal is depressed.

3. An electronically controlled shift system for a manual multi-speed transmission of a motor vehicle, comprising:

a manually operated shift lever for selecting a gear;

an initiation module connected to said shift lever for receiving an electrical input signal indicative of said selected gear and for transmitting a first electrical signal indicative of an entry force;

a synchronization module connected to said initiation module for determining a synchronization force and for transmitting a second electrical signal indicative of said synchronization force;

a termination module connected to said synchronization module for transmitting a third electrical signal indicative of an end force;

a dual motion actuator connected to a shift rail of the transmission, responsive to said first signal, to said second signal and to said third signal for actuating said shift rail to engage said selected gear;

a mechanically operated clutch connected to the transmission, having a clutch pedal and a clutch interlock device connected between said clutch pedal and said clutch; and a clutch interlock module connected to said clutch interlock device for preventing clutch release before said shift rail engages said selected gear by monitoring actuation of said shift rail.

4. The system of claim 3 further comprising:

a preselect module connected to said actuator and said clutch for preventing transmission of said first signal, said second signal and said third signal until said clutch pedal is depressed.

5. A method for shifting an electronically controlled shift system for a transmission of a motor vehicle, said method comprising the steps of:

determining a synchronization force for translating a shift rail of the transmission from a neutral position into a selected in-gear position;

applying an entry force for moving said shift rail from said neutral position to a pre-synchronization position, thereby taking up synchronizer clearance;

applying said synchronization force for actuating said shift rail from said pre-synchronization position into said selected in-gear position;

applying an end force for easing said shift rail into said selected in-gear position;

selecting a gear using a manually operated shift lever, said gear associated with said selected in-gear position for said shift rail in the transmission; and depressing a mechanically operated clutch to initiate gear shifting, prior to the step of determining a synchronization force.

6. The method of claim 5 wherein said mechanically operated clutch includes a clutch interlock mechanism for preventing release of said clutch before said shift rail is in said selected in-gear position.

7. A manual multi-speed transmission for a motor vehicle comprising:

a plurality of synchronized gears;

a shift sleeve for selecting one of said gears;

a shift rail operatively engaged with said shift sleeve;

an actuator engaged with said shift rail;

a controller having an initiation module connected to a shift lever for receiving an electrical input signal indicative of a selected one of said gears and for transmitting a first electrical signal indicative of an entry force;

a synchronization module connected to said initiation module for determining a synchronization force and for transmitting a second electrical signal indicative of said synchronization force;

a termination module connected to said synchronization module for transmitting a third electrical signal indicative of an end force, whereby said actuator actuates said shift rail based upon said first signal, said second signal and said third signal;

a clutch connected to the transmission, having a clutch pedal and a clutch interlock device connected between said clutch pedal and said clutch; and a clutch interlock module connected to said clutch interlock device for preventing clutch release before said shift rail engages said selected one of said gears by monitoring actuation of said shift rail.

8. The transmission of claim 7 further comprising:

a preselect module connected to said actuator and said clutch for preventing transmission of said first signal, said second signal and said third signal until said clutch pedal is depressed.

9. An apparatus for supporting an electronically controlled shift system for a transmission of a motor vehicle, having a shift lever for selecting a gear and an actuator, comprising:

an initiation module connected to said shift lever for receiving an electrical input signal indicative of said selected gear and for transmitting a first electrical signal indicative of an entry force;

a synchronization module connected to said initiation module for determining a synchronization force and for transmitting a second electrical signal indicative of said synchronization force;

a termination module connected to said synchronization module for transmitting a third electrical signal indicative of an end force, whereby the actuator actuates a shift rail of the transmission based upon said first signal, said second signal and said third signal; and a protection module connected to the transmission for monitoring a shaft speed of the transmission and a vehicle speed of the vehicle, and for determining a shift condition by comparing said shaft speed and said vehicle speed to a predetermined shaft speed and a predetermined vehicle speed for said selected gear, whereby said protection module prevents said first signal, said second signal and said third signal from being transmitted during an unacceptable shift condition.

10. An apparatus for supporting an electronically controlled shift system for a transmission of a motor vehicle, having a shift lever for selecting a gear and an actuator, comprising:

an initiation module connected to said shift lever for receiving an electrical input signal indicative of said selected gear and for transmitting a first electrical signal indicative of an entry force;

a synchronization module connected to said initiation module for determining a synchronization force and for transmitting a second electrical signal indicative of said synchronization force; and a termination module connected to said synchronization module for transmitting a third electrical signal indicative of an end force, whereby the actuator actuates a shift rail of the transmission based upon said first signal, said second signal and said third signal;

wherein said synchronization force is determined using a first temperature compensation term when an oil temperature is above an oil temperature threshold and a second temperature compensation term when said oil temperature is below said oil temperature threshold.

11. An apparatus for supporting an electronically controlled shift system for a manual multi-speed transmission of a motor vehicle, comprising:

a manually operated shift lever for selecting a gear;

an initiation module connected to said shift lever for receiving an electrical input signal indicative of said selected gear and for transmitting a first electrical signal indicative of an entry force;

a synchronization module connected to said initiation module for determining a synchronization force and for transmitting a second electrical signal indicative of said synchronization force;

a termination module connected to said synchronization module for transmitting a third electrical signal indicative of an end force;

a dual motion actuator connected to a shift rail of the transmission, responsive to said first signal, to said second signal and to said third signal for actuating said shift rail to engage said selected gear;

a shift-out module connected to said shift lever for receiving said electrical input signal and for transmitting a shift-out signal, whereby said actuator axially translates said shift rail from a current gear position into a first neutral position based upon said shift-out signal; and a shift-across module connected to said shift out module for transmitting a shift-across signal, whereby said actuator rotates said shift rail from said first neutral position to a second neutral position based upon said shift-across signal.

12. A method for shifting an electronically controlled shift system for a transmission of a motor vehicle, said method comprising the steps of:

determining a synchronization force for translating a shift rail of the transmission from a neutral position into a selected in-gear position;

applying an entry force for moving said shift rail from said neutral position to a pre-synchronization position, thereby taking up synchronizer clearance;

applying said synchronization force for actuating said shift rail from said pre-synchronization position into said selected in-gear position;

applying an end force for easing said shift rail into said selected in-gear position;

actuating said shift rail from a current in-gear position into a first neutral position; and actuating said shift rail into a second neutral position, whereby said shift rail can be actuated from said second neutral position to said selected in-gear position, prior to the step of applying said entry force.

13. A method for shifting an electronically controlled shift system for a transmission of a motor vehicle, said method comprising the steps of:

determining a synchronization force for translating a shift rail of the transmission from a neutral position into a selected in-gear position;

applying an entry force for moving said shift rail from said neutral position to a pre-synchronization position, thereby taking up synchronizer clearance;

applying said synchronization force for actuating said shift rail from said pre-synchronization position into said selected in-gear position; and applying an end force for easing said shift rail into said selected in-gear position;

wherein said step of determining synchronization force further comprises determining an oil temperature, and calculating said synchronization force using a first temperature compensation term when said oil temperature is above an oil temperature threshold and a second temperature compensation term when said oil temperature is below said oil temperature threshold.

14. A manual multi-speed transmission for a motor vehicle comprising:

a plurality of synchronized gears;

a shift sleeve for selecting one of said gears;

a shift rail operatively engaged with said shift sleeve;

an actuator engaged with said shift rail;

a controller having an initiation module connected to a shift lever for receiving an electrical input signal indicative of a selected one of said gears and for transmitting a first electrical signal indicative of an entry force;

a synchronization module connected to said initiation module for determining a synchronization force and for transmitting a second electrical signal indicative of said synchronization force; and a termination module connected to said synchronization module for transmitting a third electrical signal indicative of an end force, whereby said actuator actuates said shift rail based upon said first signal, said second signal and said third signal;

wherein said synchronization force is determined using a first temperature compensation term when an oil temperature is above an oil temperature threshold and a second temperature compensation term when said oil temperature is below said oil temperature threshold.

* * * * *

UNITED STATES PATENT AND TRADEMARK OFFICE
CERTIFICATE OF CORRECTION

PATENT NO.     : 6,145,398                                              Page 1 of 1
DATED          : November 14, 2000
INVENTOR(S)    : Eric A. Bansbach et al.

It is certified that error appears in the above-identified patent and that said Letters Patent is hereby corrected as shown below:

Column 2,
Line 28, after "is" insert -- a --
Line 39, after "FIG. 3" insert -- ; --

Column 3,
Line 7, after "steps" insert -- of --

Column 4,
Line 39, "drivers" should be -- driver's --

Column 5,
Line 9, "timers" should be -- timer --
Line 34, "Kt" should be -- $K_t$ --

Column 6,
Line 14, "An" should read -- A --

Column 11,
Line 40, "its" should be -- it's --

Column 12,
Line 30, after "into" delete "a"

Signed and Sealed this

Twenty-second Day of April, 2003

JAMES E. ROGAN
*Director of the United States Patent and Trademark Office*